3,447,179
TRASH PICKUP AND DISPOSAL DEVICE
Jones E. Copeland, 3105 Darby Lane,
Denton, Tex. 76201
Filed May 8, 1967, Ser. No. 636,845
Int. Cl. E01h 1/04; A01f 77/06
U.S. Cl. 15—81                                    16 Claims

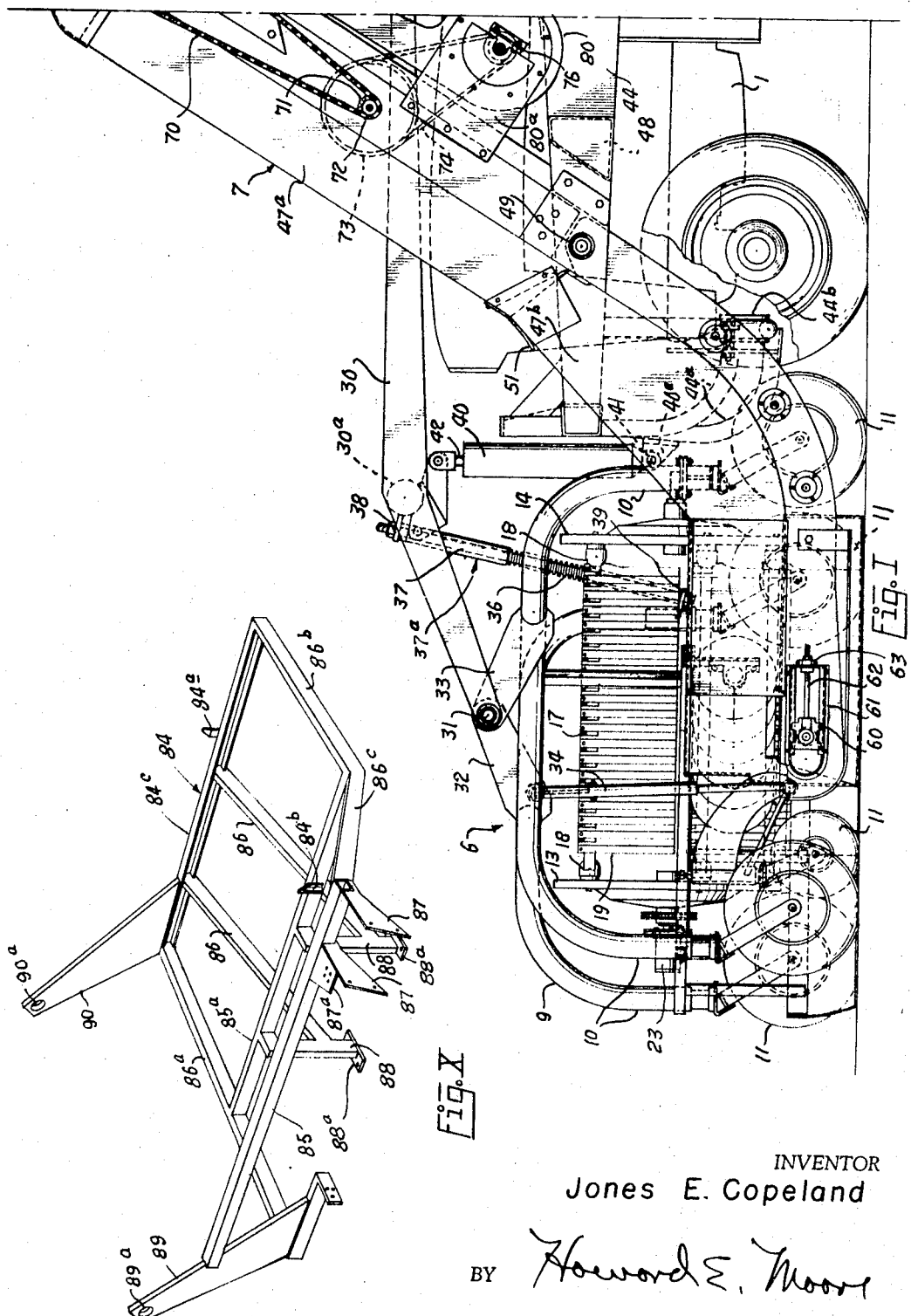

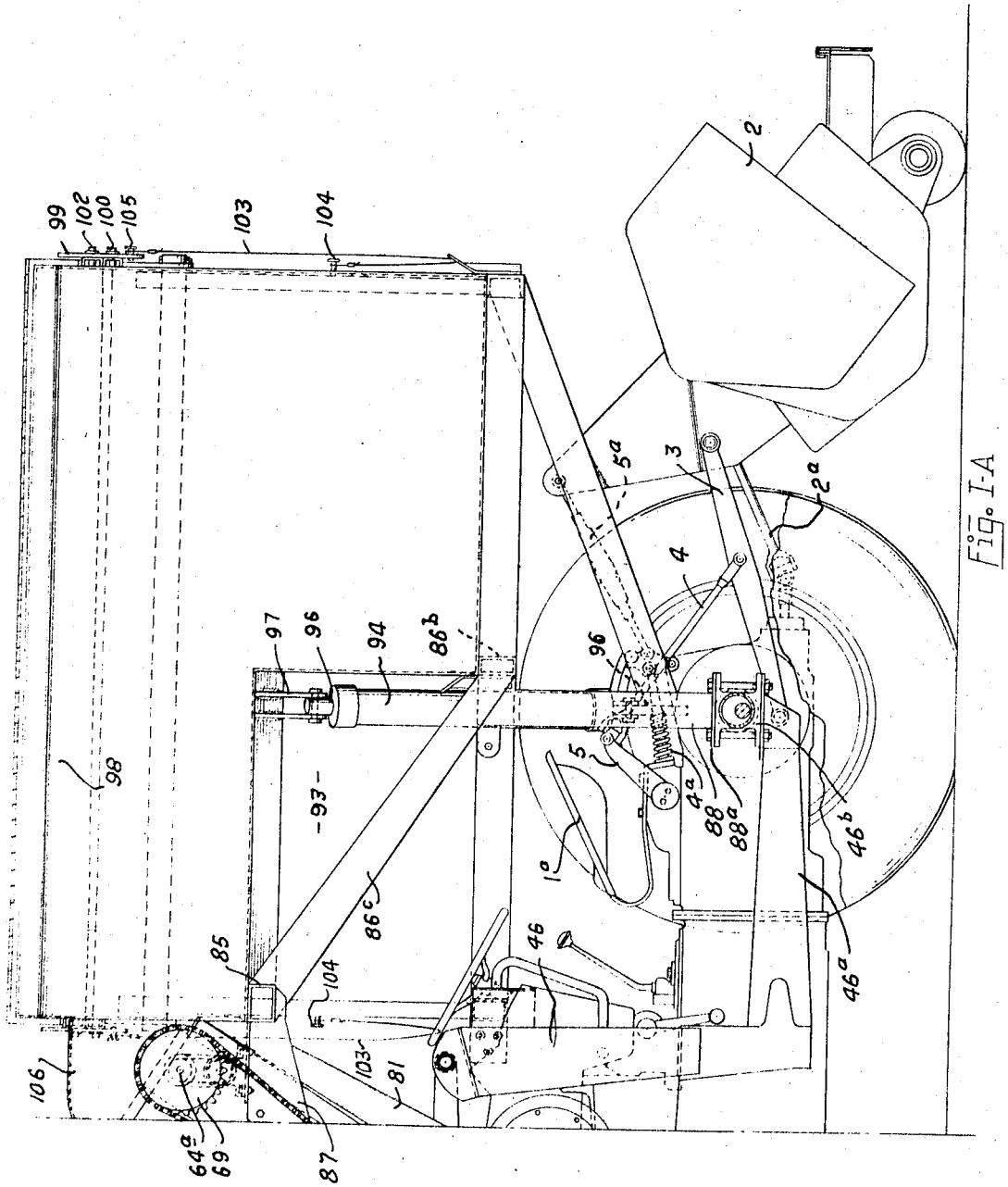

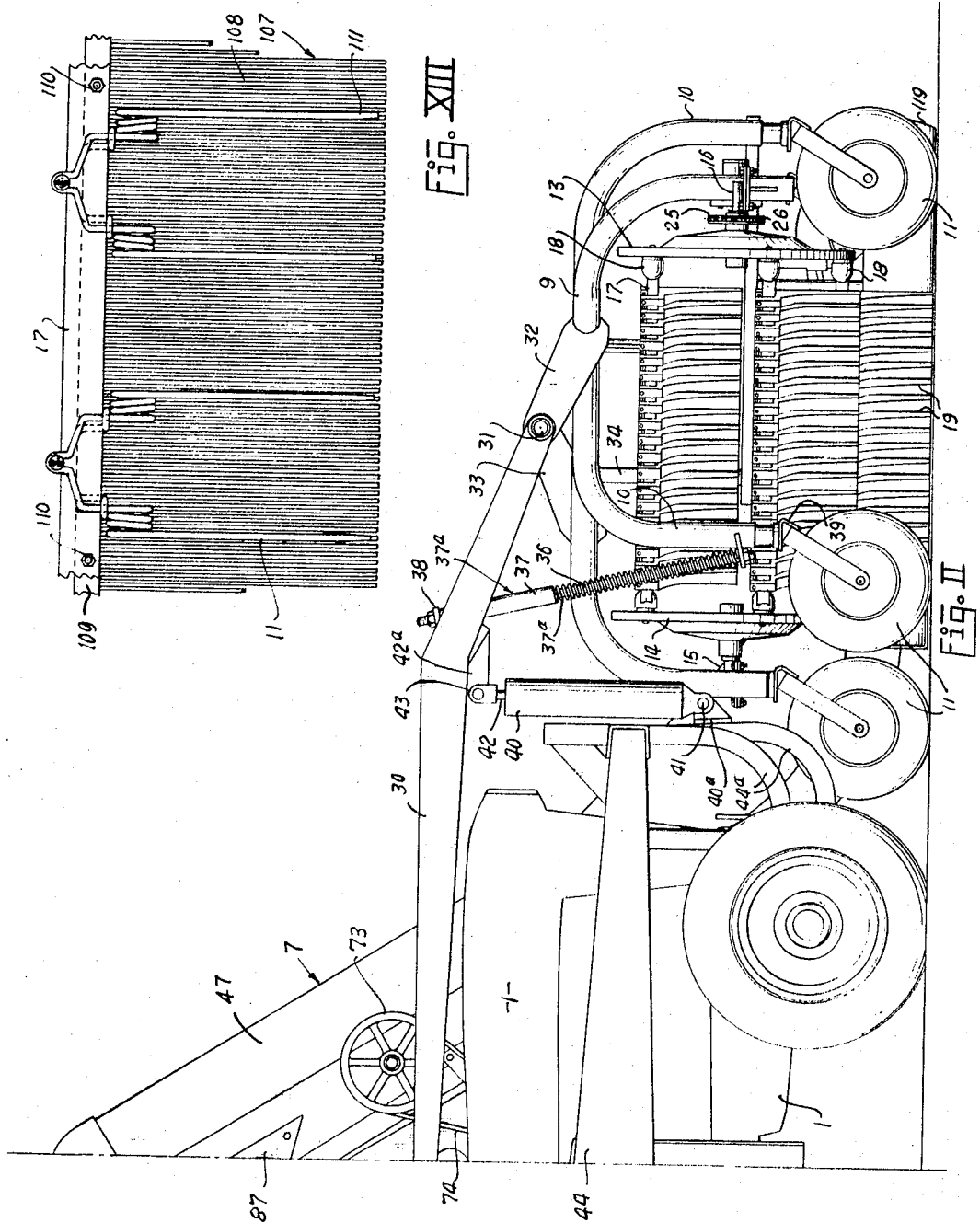

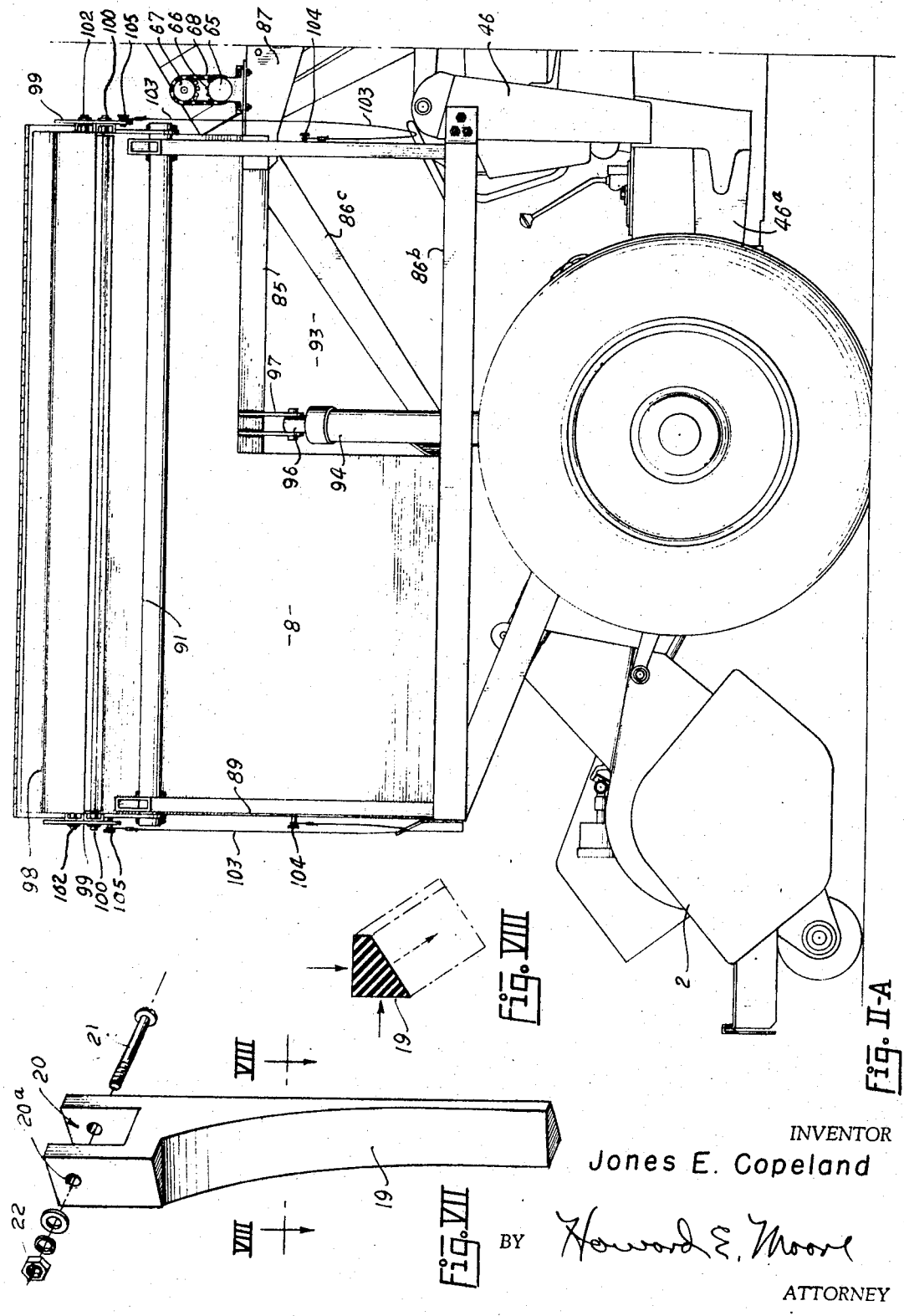

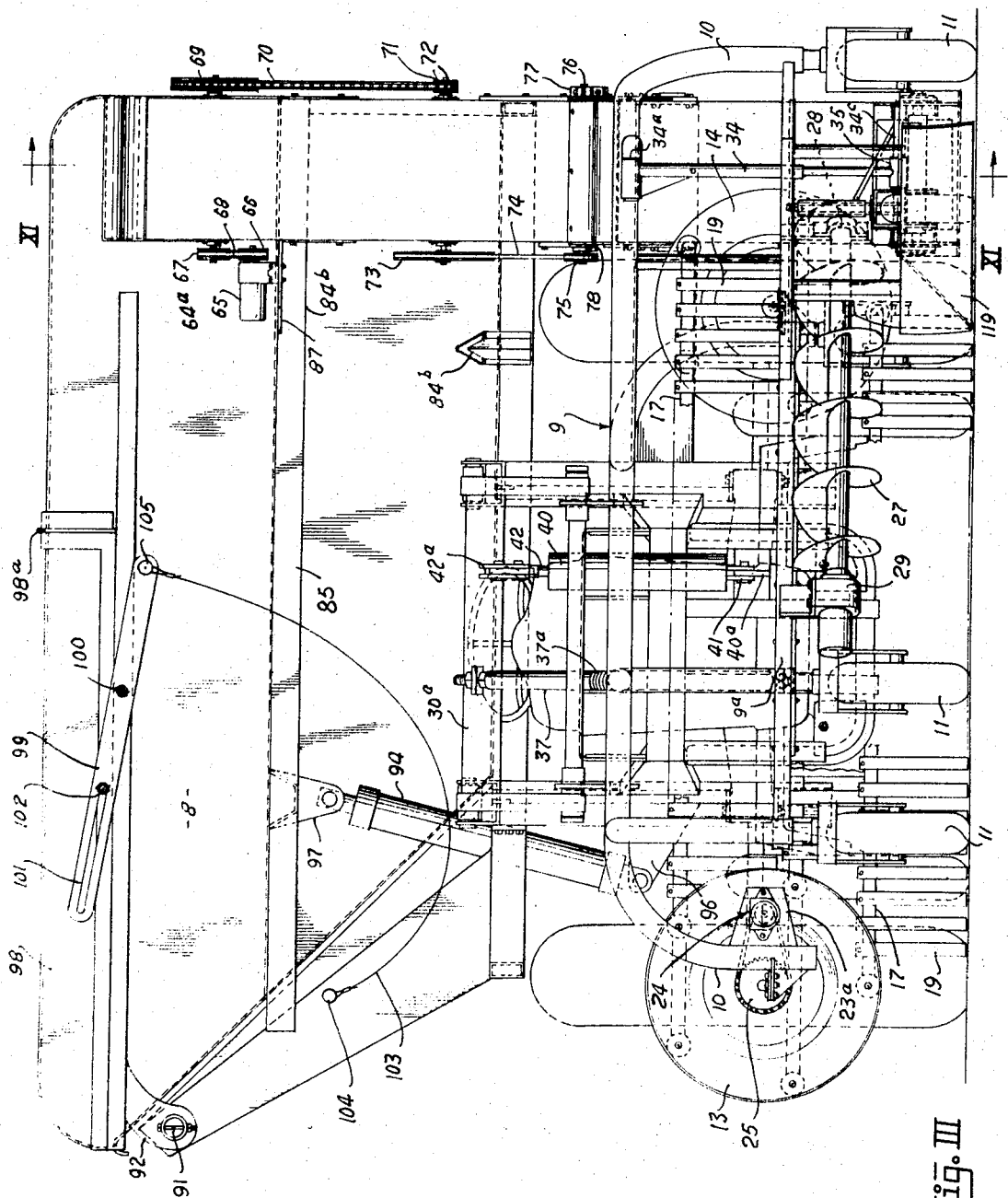

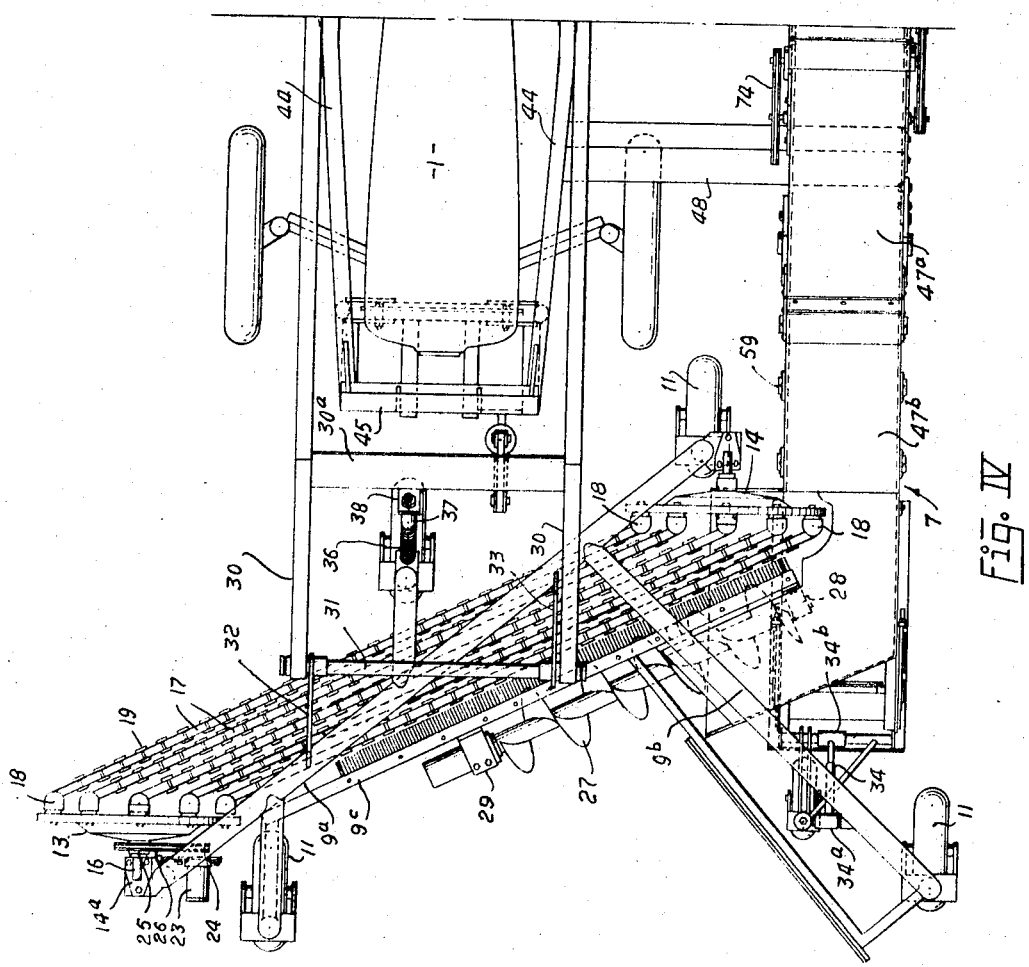

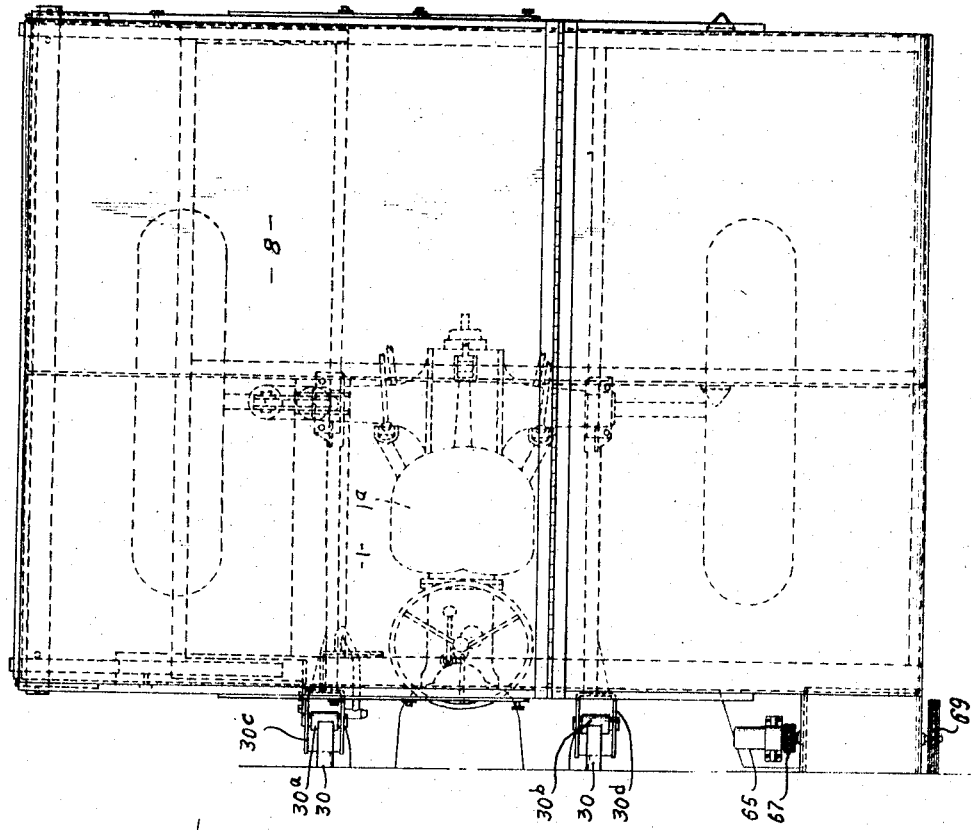
Fig. IV-A
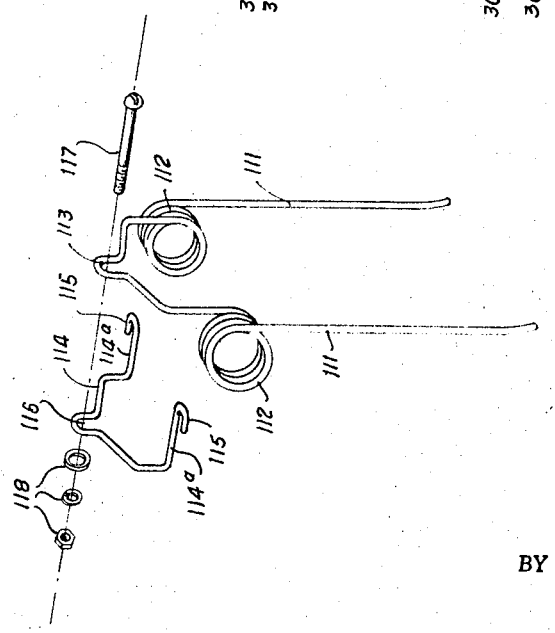
Fig. IX
INVENTOR
Jones E. Copeland
BY Howard E. Moore
ATTORNEY

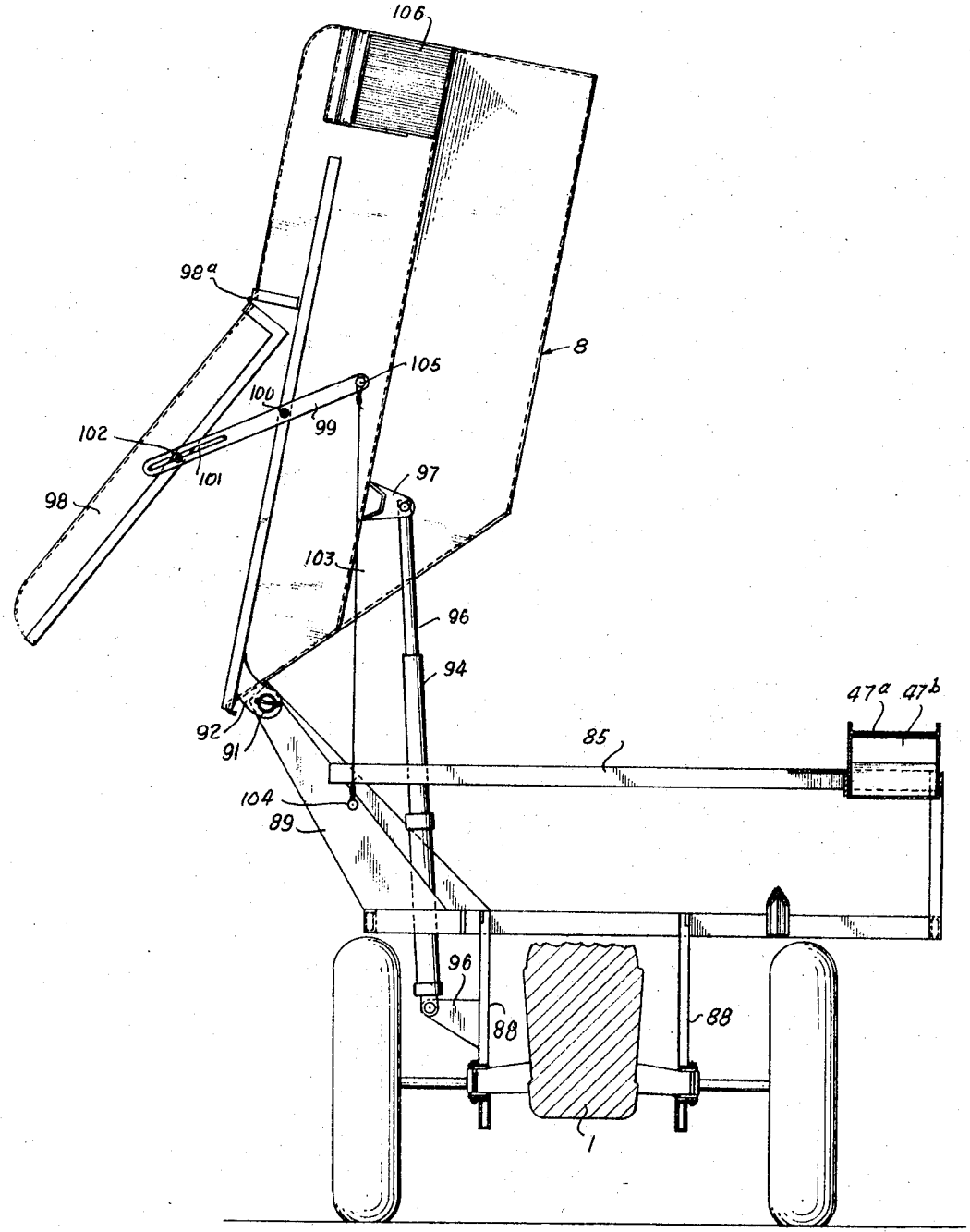
Fig. V

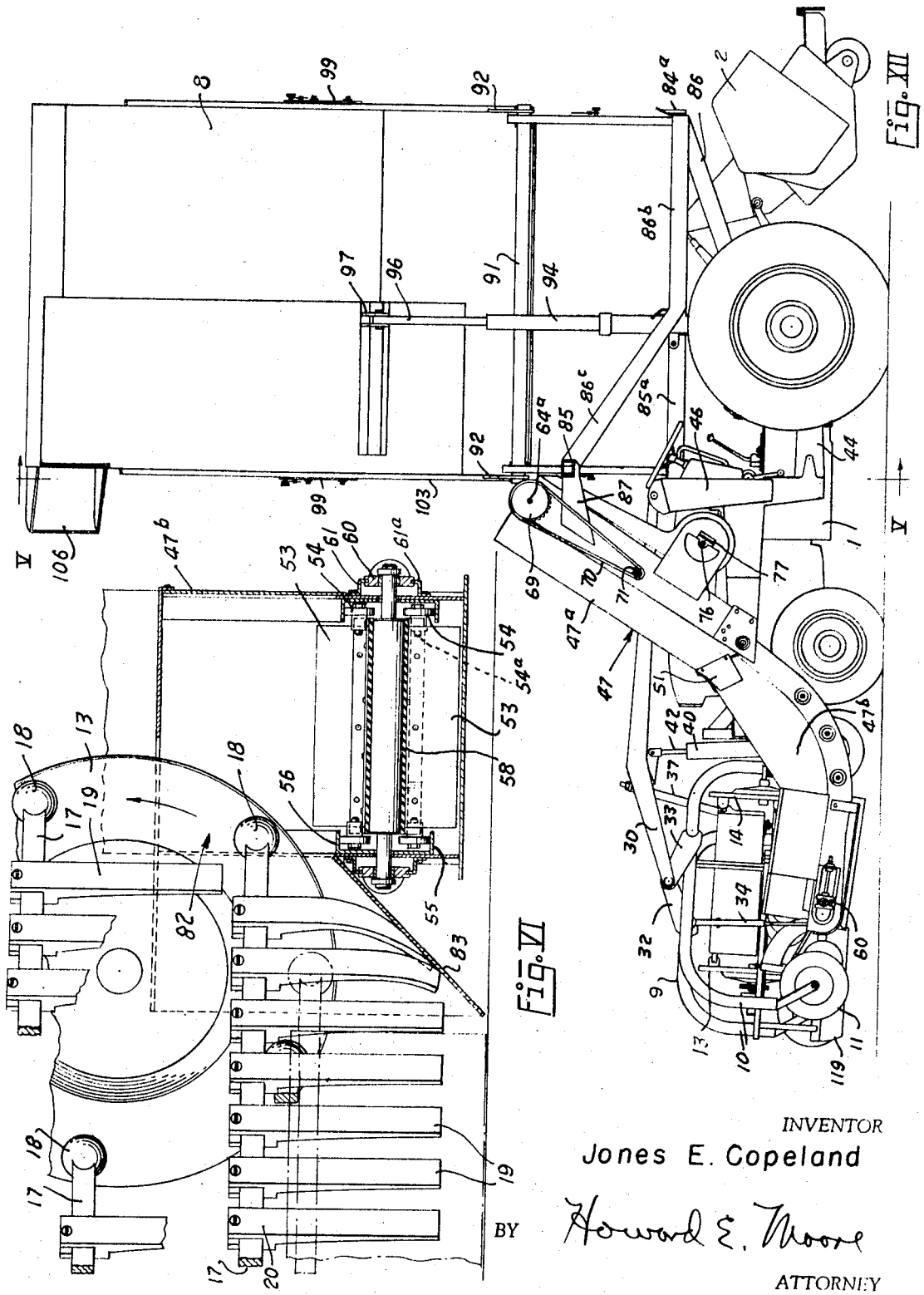

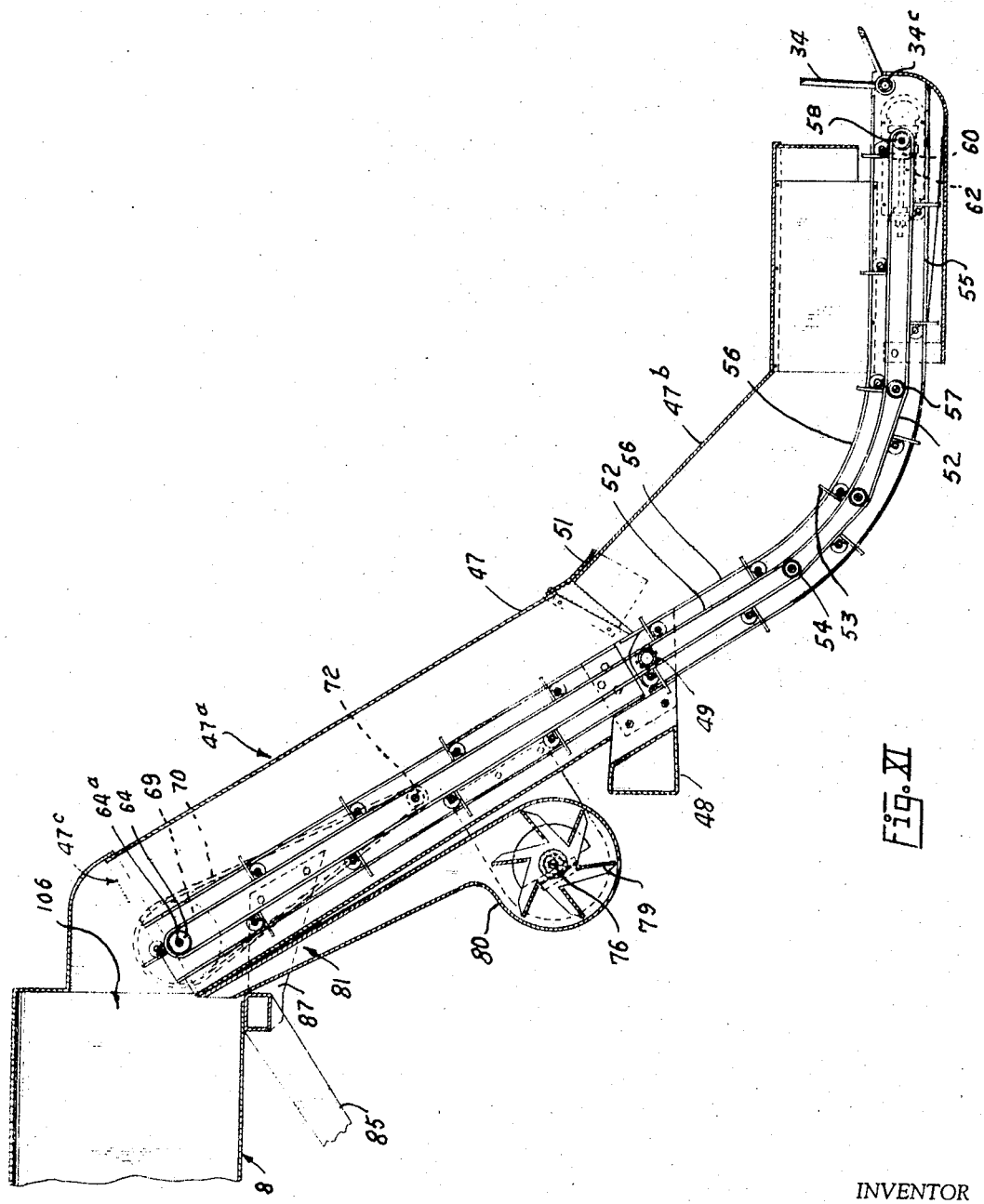

ABSTRACT OF THE DISCLOSURE

A mobile, self-propelled trash pickup and disposal machine which includes laterally movable rotatable tines or brushes which move paper, bottles, cans and other debris on the terrain over which the device travels toward a conveyor where the debris is deposited on the entry end of the conveyor and is carried by the conveyor to a hopper mounted on the vehicle. A blower is provided for moving the debris from the conveyor into the hopper. The hopper is tiltably mounted with respect to the vehicle and may be raised to dump the debris therefrom. An automatically openable cover is provided on the hopper which is opened by the upwardly moving motion of the hopper in dumping the debris therefrom. The pickup mechanism and the outer end of the conveyor are pivotally mounted with respect to the vehicle whereby they may be raised off the ground while the device is being transported. The device is mounted on a tractor or like vehicle, and all components thereof are operated by hydraulic power supplied from the transporting vehicle.

Background of the invention

A long existent problem in recreation areas and along the right-of-way of highways has been the scattering of trash such as papers, wrappers, bottles, cans, rocks, sticks and other debris over such areas, which not only provides an unsightly appearance, but presents hazards to mowing and maintenance of such areas by reason of breaking and dulling of mowers and maintenance equipment which comes into contact therewith.

Furthermore, the picking up and disposal of such debris has been unusually expensive because it is customarily picked up by hand labor and deposited in a vehicle or container, thereby requiring excessive labor and time.

No satisfactory economically operated mobile device has hereintofore been provided for performing the function of picking up and disposing of debris along highway shoulders, in recreation areas and the like.

It is, therefore, a primary object of the invention to provide a mobile trash pickup device which efficiently picks up different types of debris, deposits it on a conveyor which in turn deposits it in a container as the supporting vehicle moves forward, and wherein the debris may be quickly and easily deposited from the container at a selected location.

Still another object of the invention is to provide a trash pickup vehicle wherein debris is encountered by laterally rotatable tines or brushes at the front end thereof which sweep the debris sidewise, and deposits same on a conveyor at one side of the vehicle, which in turn conveys the material to a container carried by the vehicle, from which it may be subsequently deposited.

Still another object of the invention is to provide a trash pickup device having laterally rotatable brushes or ties thereon which successively contact the ground to move trash and debris encountered thereby to one side where is is deposited upon a conveyor, and wherein a multiplicity of different types of brushes or tines may be substituted therein.

A still further object of the invention is to provide a trash pickup device of the type indicated wherein the pickup brushes and/or tines and the conveyor may be raised from contact with the ground for transportation of the device.

Still another object of the invention is to provide a mobile trash pickup device wherein the sweeper portion of the device, which is carried at the front end thereof, is arranged to resiliently float with reference to the support therefor to permit same to conform to irregular terrain.

Brief summary of the invention

Still another object of the invention is to provide in such a trash pickup device flexible rotatable tines or brushes which provide for a sweeping action to move debris laterally and deposit same upon a conveyor which transport same to a container on the vehicle.

Another object of the invention is to provide in such a trash pickup device means for tilting the receptacle with reference to the conveyor housing to permit debris to be deposited from the container without moving the conveyor.

Still another object of the invention is to provide in such a trash pickup device means for automatically opening the lid to the container when it is raised and tilted sidewise.

Another object of the invention is to provide a flighted conveyor in association with the rotatable tines or brushes and the main conveyor to move heavy objects, such as bottles, cans, rocks or sticks to one side to deposit same on the main conveyor.

Another object of the invention is the provision of means to adjust the tension of the conveyor.

Another object of the invention is to provide a tractor mounted trash pickup device wherein the trash pickup mechanism is mounted at the front of the tractor to pick up and deposit the debris in a container carried on the vehicle, and wherein a mower is mounted at the rear of the tractor to mow grass along right-of-way or recreation areas after the trash has been picked up to thereby protect the mower against damage by coming into contact with such debris.

Other and further objects of the invention will become apparent upon reading the detailed specification hereinafter following and by referring to the drawings annexed hereto.

Description of the drawings

A suitable embodiment of the invention is shown in the attached drawings wherein, FIGURES I and I–A are a side elevational view of the trash pickup device mounted on a vehicle such as a tractor, FIGURES II and II–A are a side elevational view of the trash pickup device taken from the opposite side from that shown in FIGURES I and I–A, FIGURE III is a front end view of the trash pickup device, FIGURES IV and IV–A are a top plan view of the trash pickup device, FIGURE V is a sectional view, partially in elevation, taken along the line V—V of FIGURE XII, FIGURE VI is a fragmentary sectional view, partially in elevation, showing the relationship of the flexible tines to the elevated ramp leading into the outer end of the conveyor and showing the roller mountings of the conveyor and the adjustable end guide roller therefor, FIGURE VII is an enlarged perspective view of a typical flexible tine employed with the rotatable trash moving member, and showing the means for mounting same on the support arms therefor, FIGURE VIII is a cross-sectional view taken on the line VIII—VIII of FIGURE VII showing the rubber or other flexible material of the tines, FIGURE IX is an exploded view of the wire type flexible tines and showing the mounting clamp therefor for mounting same on the transverse support therefor, FIGURE X is a top perspective view of the frame on which the pivoted receptacle is mounted, FIGURE XI is a cross-sectional elevational view of the conveyor assembly, FIGURE XII is a cross-sectional elevational view of the trash pickup device with the brush assembly, conveyor, mower and the receptacle in raised position, and FIGURE XIII is a fragmentary front elevational view of the combination brush and flexible tine assembly which may be employed with the device.

*Detailed description*

Numeral references are employed to indicate the various parts shown in the drawings and like numerals indicate like parts throughout the various figures of the drawings.

The numeral 1 indicates a tractor of standard design to which the device hereinafter described is secured for transport and operation.

The numeral 2 indicates a mower of conventional design which may be of any type conventionally used for pulling behind a tractor to cut grass along a right-of-way or other area. The detailed construction of the mower 2 will not be described herein inasmuch as it is not per se a part of the invention, except as generally indicated hereinafter.

The mower 2 is attached to the tractor by means of pivotally mounted tow bars 3 which may be raised and lowered by means of a link 4 which in turn is raised through a link 5 by means of hydraulic power, or otherwise applied from the tractor. The mower is resiliently urged toward the ground by a spring 4a through a link arrangement 5a. The mower is operated through a power take-off 2a from the tractor.

The basic components of the trash pickup and disposal device are the pickup mechanism 6, conveyor mechanism 7 and the hopper or container 8.

The pickup mechanism will be first described. It includes a general frame 9 which includes diagonally disposed members 9a and 9b (FIGURE IV) which are turned downwardly as indicated at 10 to provide legs on which the caster wheels 11 are mounted.

The spaced end discs or wheels 13 and 14 are rotatably mounted to two of the spaced downwardly extending legs 10 and are supported thereon by bearings 15 and 16 which are mounted on appropriate brackets 14a and 15a secured to said legs.

It will be noted that the discs 13 and 14 rotate in a plane normal or transversely to the longitudinal axis of the tractor 1, and are spaced longitudinally thereof for the purposes hereinafter mentioned.

A plurality of diagonally disposed tine mounting arms 17 are rotatably disposed between the discs 13 and 14 by means of universal bearing joints 18 which are spaced peripherally about the discs. Therefore, when the discs rotate as hereinafter described, the arms 17 are caused to rotate in a plane diagonal to the longitudinal axis of the tractor and said arms are caused to alternately contact and move along the surface of the terrain and thereby causes tines 19, secured to the respective arms, to alternately come into contact, or near contact, with the terrain.

Different types of tines 19 may be employed with the device but a suitable form is indicated in detail in FIGURES VII and VIII. This form of tine consists of a flexible tooth-like member made of flexible material such as rubber or plastic which is arranged to bend in response to force as it contacts the ground or other surface. The tines may be attached to the mounting arms 17 by means of a bifurcated end 20 thereon which may be inserted about the arm 17 and attached thereto by means of bolts 21 which extend through appropriate passages 20a in said bifurcated end and are secured in place by means of washers and nuts 22.

The discs 13 and 14 are rotated in unison by hydraulic motor 23 mounted on a bracket 23a secured to one of the downward extending legs 10. The disc 13 is rotated by a drive chain 26 which extends about a drive sprocket 24 attached to the shaft of the hydraulic motor 23 and a driven sprocket 25 secured about the axle of the disc 13. Hydraulic power is supplied to the motor 23, as well as all other hydraulic motors and rams indicated herein, from a conventional hydraulic power supply carried on the tractor.

The rotation of the disc 13 will rotate the disc 14 in unison therewith through the mounting arms 17, which are attached therebetween by means of the bearing joints 18.

It will be seen as the discs 13 and 14 rotate the flexible tines 19 on the respective arms 17 are caused to come into alternate lateral sweeping movement against the terrain and will encounter and move laterally and rearwardly any loose trash or debris scattered on the right-of-way or other area being cleaned.

A flighted conveyor 27 is rotatably supported by a transverse frame member 9c by means of bearings 28 secured to said frame member. The flighted conveyor 27 is rotated by a hydraulic motor 29, secured to said transverse frame member 9c.

The flighted conveyor 27 is arranged to encounter large and heavy articles of debris, such as rocks, sticks, and the like, which are too heavy for the flexible tines to push sidewise, and convey same to the entry end of the conveyor as hereinafter described.

The support and lifting mechanism for the pickup mechanism includes spaced horizontal arm members 30 which are reinforced by a cross brace 30a and are joined together at their outer ends by a tubular joinder member 31. A forwardly extending lifting link 32 and a rearwardly extending lifting link 33 are secured at their inner ends to the cross brace 31 and at their outer ends to the diagonal support 9a so that the pickup mechanism is supported on said forwardly and rearwardly extending arms 32 and 33, whereby the pickup mechanism may be lifted off the ground as the longitudinal arms 30 are raised in the manner hereinafter described.

The longitudinal arms 30 are pivotally secured at their inner ends on pivot bearings 30a and 30b which are rotatably secured between ears 30c and 30d which in turn are secured to the upward extending frame members 46 which also support one side of the support frame for the hopper, as hereinafter described. The arms 30 may be pivoted upwardly on the pivot bearings 30a and 30b as the pickup mechanism is raised off the ground.

The forwardly extending frame member 9b for the pickup assembly has an adjustable brace 34 pivotally secured thereto as indicated at 34a and the lower end of said brace is pivotally secured by a sleeve 35 rotatable about a rod 34c secured between the outer end edges of the conveyor frame so that when the pivoted frame for the pickup assembly is lifted as hereinafter described, the outer section of the conveyor frame will be lifted therewith, and when in lowered position the outer end of the conveyor frame is suspended on the suspension rod 34.

A spring 36 is disposed about a shaft 37. The upper end of the shaft 37 is secured to a lug 38 attached to the cross brace 30a and the lower reduced end of the shaft 37 slidably extends through a mounting lug 39 secured to one of the downwardly extending legs 10 of the frame 9 for the pickup assembly. The pin 37 has an enlarged portion 37a against which one end of the spring 36 is abutted and the other end of the spring is abutted against the lug 39. Thus it will be seen that the spring 36 permits relative flexible movement between the longitudinal frame members 30 and the frame 9 supporting the pickup mechanism, it being noted that arms 32 and 33 are pivoted about cross brace 31. Thereby the pickup frame is permitted to conform to irregularities in terrain over which it passes.

A hydraulic ram 40 is pivotally secured at its lower end to a bracket 40a by pivot pin 41. The bracket 40a is secured to the forward end of the mounting frame for the device as will be hereinafter described. The piston rod 42 for the hydraulic ram 40 is pivotally secured by means of a suitable mounting bracket 42a to the cross brace 30a. When hydraulic force is applied inside the cylinder of the hydraulic ram 40 to extend the piston rod 42, as shown in FIGURE XII, the longitudinal frame members 30 will be raised about the pivots 30a and 30b to thereby lift the pickup frame 9 and the pickup mechanism carried thereby from the ground and at the same time raise the forward frame of the conveyor 7 off the ground about the pivot point 49 therefor.

The general mounting frame for the device comprises the forwardly extending longitudinal brace members 44 disposed on each side of the tractor which are attached to the vertical frame members 46 which in turn are secured to the lower rearwardly extending frame members 46a which are secured to the rear axle of the tractor by appropriate attachment clamps 46b. The arms 44 are secured at their forward ends to downwardly extending arms 44a which in turn are secured to the front of the frame of the tractor by appropriate mounting brackets 44b.

The upper ends of the arms 46 are secured to the mounting frame for the hopper as will be hereinafter described.

The conveyor 7 includes a general housing 47 having a fixed portion 47a and a pivotal portion 47b (see FIGURE XII). The pivotal portion 47b is pivotally attached to the fixed portion 47a by a pivoted joint 49 comprised of a pivot pin or sleeve secured between the opposite walls of the fixed and pivotal portions of the conveyor frame. Edges of the respective conveyor side walls are arranged to move in overlapped relationship and the gap therebetween is closed by a flexible cover member 51.

The fixed conveyor frame is secured to a cross brace 48 extending between the forward extending brace 44 and the fixed frame 47.

A conveyor belt 52 rotatably extends about end guide rollers 58 and 64 and are guided about the guide rollers 58 and 64 and maintained along the lower surface of the conveyor frame by means of guide rollers 54 rotatably carried on suitable bearings 54a mounted at the edges of the conveyor belt 52, said rollers 54 being rotatable against the opposed track flanges 55 and 56 to thereby maintain the conveyor belt 52 in proper alignment along the lower side of the conveyor frame.

Spaced lugs 53 are provided on the outer surface of the conveyor belt 52 to engage material picked up on the conveyor and carry same therewith as the conveyor rotates.

The guide roller 58 at the outer end of the conveyor is adjustable longitudinally of the conveyor frame to adjust the tension of the belt by means of slidable bearing mounts 60 which are adjustable along guide supports 61 having inward extending flanges 61a thereon which slidably engage grooves in the outer edges of the adjustable bearing support 60.

The adjustable bearing supports 60 are attached to adjustment screws 62 which has a threaded outer end extending through the end of the mounting guide 61. The threaded portion of the screws 62 have adjustment nuts 63 thereon whereby the adjustable bearing mounts 60 may be moved longitudinally of the conveyor frame 47 to thereby move the end roller 58 longitudinally of the frame to thus adjust the tension of the belt 52. The conveyor belt 52 is rotated by a hydraulic motor 65 which is mounted on a mounting shelf 87a secured to the supporting frame for the hopper, hereinafter described.

A sprocket 66 is attached to the shaft of the hydraulic motor 65 which drives a chain 68 extending about a sprocket 67 which is secured to, and rotates, the shaft 64a for the upper end guide roller 64. The shaft 64a rotatably extends through the opposite wall of the conveyor housing 47a and is secured at its outer end to a drive sprocket 69 which drives a chain 70, which in turn drives a sprocket 71. The sprocket 71 is secured to a shaft 72 which rotatably extends through the side walls of the conveyor frame 47a. A sheave 73 is secured to the end of the shaft 73 and the drive belt 74 extends about the sheave 73 and a sheave 75. The sheave 75 is attached to a shaft 76 which rotatably extends through the side walls of the fan housing 80. The ends of the shaft 76 are mounted on the suitable bearings 77 and 78 carried by the side walls of the fan housing 80. A blower fan 79 is mounted on the shaft 76 and is arranged to be rotated therewith. The fan housing 80 is secured by mounting plate 80a to conveyor frame 47a and has a discharge extension 81 thereon which discharges into the entry opening 106 leading into the hopper 8.

It will thus be seen that the motor 65 rotates the upper conveyor guide roller 64 and therethrough rotates the fan 79. Air discharged by the fan 79 through the discharge passage 81 blows trash and debris deposited by the conveyor belt 52 in the entry opening to the hopper into the hopper to prevent same from becoming clogged.

A portion of the side wall of the pivoted conveyor frame 47b is relieved at the outer end adjacent the inner end of the rotatable pickup tine assembly and is indicated at 82.

An inclined ramp 83 (FIGURE VI) is secured to the lower edge of the entry opening 82 into the conveyor along which trash and debris swept up by the flexible tines 19, or brush 107, may be pushed to deposit same on the conveyor.

It will be seen from FIGURE VI that the flexible tines 19 are flexed to drag along the upper side of the ramp 83 as they move toward the entry opening 82 to thereby sweep and flick the trash onto the conveyor as the tines are allowed to relax as they move outwardly and upwardly out of contact with the inclined ramp 83.

The mounting frame for the hopper 8 is shown in FIGURE X and is indicated generally at 84.

The hopper support frame includes a transverse member 85 and downward extending longitudinal angle members 86 which have legs 88 thereon which are attached at their upper ends to the transverse brace member 85a extending between the ends 86a and 86b. The legs 88 have attachment plates 88a on the lower ends thereof which are secured by appropriate bolts to the fixture 46b secured about the rear axle of the tractor.

A diagonal brace 86c extends between the outer end of the transverse brace 85 and the end member 86b of the frame.

Spaced attachment flanges 87 embrace the upper end portion 47a of the conveyor housing 7 and are secured thereto to support the conveyor housing at the upper end.

Angular upwardly extending ears 89 and 90 are provided on the support frame 84, which have aligned holes 89a and 90a in the outer ends thereof through which a pivot shaft 91 may be passed and through attachment ears 92 on opposite sides of the hopper 8 and which is secured in place therein by suitable cotter pin or other means to thereby pivotally mount the hopper 8 with relation to the ears 89 and 90, so that the hopper can be tilted upwardly when desired to discharge material therefrom.

Guide lugs 84a and 84b extend upwardly from side frames 85a and 84c.

The hopper 8 is so constructed as to provide a relieved area 93 in the lower side thereof to provide head room for the driver of the tractor disposed on the seat 1a thereof.

A hydraulic ram 94 is pivotally attached at its lower end to a lug 96 secured to one of the downwardly extending legs 88 of the frame 84. The extendible piston rod 96 of the hydraulic ram 94 is pivotally attached to a lug 97 secured to the lower wall of the hopper 8. The hydraulic ram is supplied with hydraulic power from the conventional hydraulic supply equipment on the tractor, or other conveying vehicle.

It will be seen in FIGURE V that the extension of the piston 96 of the hydraulic ram 94 will pivot the receptacle 8 upwardly.

A cover 98 is hingedly attached at 98a to the upper side of the container 8. A raising arm 99 is pivotally attached at 100 to the wall of the container 8 and has an elongated slot 101 in the outer end thereof in which a guide pin 102 is slidably disposed. The guide pin 102 is secured to the outer wall of the cover 98 and has an enlarged member on the outer end thereof to retain same in slidable relationship in the slot 101.

A cable or other flexible line 103 is secured at 104 to one of the ears 89 and is secured at 105 to the outer end of the raising arm 99.

It will be seen in FIGURE III that when the hopper 8 is in downward position there is slack in the line 103 and that when the hopper 8 is raised, as in FIGURE V, the slack will be taken out of the line 103 before the hopper 8 is in fully raised position so that the arm 99 will be pivoted about the pivot point 100 and the pin 102 will slide in the slot 101 to exert outward force on the lid 98 to thereby raise same and permit material in the hopper 8 to be discharged therefrom.

The hopper 8 is provided with an entry opening 106 which mates with an outlet opening 47c from the conveyor frame 47a but when the hopper is raised the inlet opening 106 and outlet opening 47c are separable so that the hopper can be raised with relationship to the conveyor frame.

A flexible deflector board 119 is arranged to guide material toward the pickup tines.

An alternate form of pickup tines are shown in FIGURES IX and XIII.

In such alternate form elongated brushes 107 having relatively stiff but flexible, closely spaced bristles 108, such as nylon, secured to a mounting bar 109. Mounting bars 109 are secured to the tine mounting arms 17 by means of bolts 110.

Flexible wire-like tines 111, which may be used separately if desired, are formed with tension springs 112 and an attachment loop 113 at the upper end thereof. The tines 111 are secured to the outer face of the brush 107 by means of a resilient attachment bracket 114 which has legs 114a thereon with hooks 115 on the outer end thereof. The bracket 114 is provided with an attachment loop 116. The legs 114a may be extended through the bristles 108 of brush 107 below the mounting bar 109 and hooks 115 hooked about the tines immediately above the springs 112. In this position the mounting loops 116 and 113 extend above the tine mounting bar 17 so that a bolt 117 may be extended through the mounting loops, and nuts and washers 118 may be secured to the threaded end of the bolt 117 to secure the tines 111 to the mounting bar 17. Each of the mounting arms 17 could be provided with the assembly shown in FIGURE XIII or some of the tine mounting arms 17 could be provided with such assembly and others provided with flexible tines such as that indicated at 19.

The rotation of the mounting discs 13 and 14, as hereinbefore described, will cause the modified brush and tine assembly of FIGURE XIII to be carried upwardly and downwardly in an arcuate diagonal movement to cause the brushes and tine assemblies mounted on the arm 17 to alternately contact the ground in a sidewise sweeping motion to push trash and debris to the side into the entry end of the conveyor as hereinbefore described.

The operation and function of the device hereinbefore described is as follows:

With the pickup assembly 6 in lowered position with the wheels 11 engaging the ground the discs 13 and 14 are started in rotation by actuating the motor 23, and the flighted conveyor 27 is started in rotation by actuation of the motor 28. Rotation of the discs 13 and 14 causes the tine arms 17 to move upwardly and downwardly as they alternately move in a transverse diagonal direction toward the conveyor entry 82. The tines 19 or brush and tine assembly 107 are caused to alternately contact the ground and move laterally toward the conveyor entry sweeping trash and debris laterally on the ground and diagonally toward the entry end to the conveyor. At the same time the motor 65 is energized which rotates the conveyor belt 52 and the fan 79. The conveyor belt 52 is thus rotated so that the upper side thereof moves toward the entry opening 106 of the hopper 8 thereby carrying loose material deposited thereon by the pickup assembly to the upper end of the housing 47a where it is deposited into the entry end 106 of the hopper. The fan 79 ejects air under pressure through the conduit 81 to blow the loose material into the hopper and prevent the clogging of the entry opening 106. Large pieces of material encountered by the pickup assembly may be moved to the side by the flighted conveyor 27.

When the hopper 8 is filled, or when it is desired to empty same, the vehicle may be driven to a suitable deposit place for the trash in the hopper or it may be moved adjacent a truck or other vehicle wherein it is to be deposited. The hydraulic ram 94 is energized to cause the piston rod 96 to move outwardly thereof and thereby raise the hopper 8 off the supporting frame 84 and pivot same about the pivot shaft 91. As the hopper is raised the arm 99 will be rotated after taking up the slack in the line 103 to thereby raise the cover 98 to allow the trash and debris in the hopper to be expelled therefrom by gravity. While the device is moving forward the mower 2 can be lowered into cutting engagement with the terrain and as it moves forward articles such as bottles, rocks, cans, etc. which would normally encounter and break or dull the mower cutters are swept up from the surface before the mower encounters same.

When it is desired to transport the device the pickup assembly 6 and the pivoted portion 47b of the conveyor frame 47 may be raised from the ground by extending the piston rod 42 from the ram cylinder 40 to thereby pivot the supporting frame for the pickup assembly about the pivot bearings 30a and 30b and at the same time the conveyor frame 47b is lifted and pivoted about the pivot 49 through the suspending rod 34. The mower 2 may likewise be raised by rotating the link 5. The device is shown in transporting position in FIGURE XII and is shown in lowered position in FIGURE II.

It will be understood that other and further embodiments of my invention may be devised without departing from the spirit and scope of the appended claims.

Having described my invention I claim:

1. In a device of the class described, a vehicle, a frame extending forwardly of the vehicle; sweeper members extending transversely of the frame, said sweeper members being movable transversely of the frame and having flexible members thereon movable along the surface over which the vehicle traverses to move material sidewardly; a conveyor carried by the vehicle; an inner end on the conveyor extending rearwardly thereof; an outer end on the conveyor pivotally mounted with reference to the inner end thereof; means to raise the outer end of the conveyor, said conveyor being arranged to receive material moved sidewardly by the sweeper members; and a container on the vehicle communicating with the conveyor arranged to receive material deposited on the conveyor by said sweeper members.

2. In a device of the class described, a vehicle, a frame extending forwardly of the vehicle; sweeper members extending transversely of the frame, said sweeper members being movable transversely of the frame and having flexible members thereon movable along the surface which the vehicle traverses to move material sidewardly; a conveyor carried by the vehicle and extending rearwardly thereof, said conveyor being arranged to receive material moved sidewardly by the sweeper members; a container on the vehicle communicating with the conveyor arranged to receive material deposited on the conveyor by said sweeper members; means pivotally mounting the frame on the vehicle; and means operably connected between frame and the vehicle to raise the frame upwardly.

3. The combination called for in claim 2 with the addition of means to tilt the container to deposit material therefrom.

4. The combination called for in claim 2 wherein the sweeper members comprise spaced wheels rotatable in a plane transverse to the axis of the vehicle; aligned tine carriers spacedly connected peripherally about the wheels and extending therebetween, the said tine carriers being mounted to the wheels on bearings at each end thereof; and a plurality of tines connected to the carriers arranged to alternately move adjacent the ground as the wheels rotate.

5. The combination called for in claim 4 wherein the tines comprise brush members secured to the carriers.

6. The combination called for in claim 4 wherein the tines are made of flexible resilient material.

7. The combination called for in claim 2 with the addition of means pivotally mounting the sweeper members on the frame, and resilient means between the sweeper members and the frame to provide for a floating action therebetween.

8. The combination called for in claim 2 wherein the conveyor includes spaced guide rollers rotatably mounted adjacent the inner and outer ends thereof; a conveyor belt in frictional engagement with the guide rollers; and means to move the guide rollers at one end of the conveyor longitudinally at the conveyor to adjust the tension of the conveyor belt.

9. In a device of the class described, a vehicle, a frame extending forwardly of the vehicle; sweeper members extending transversely of the frame, said sweeper members being movable transversely of the frame and having flexible members thereon movable along the surface which the vehicle traverses to move material sidewardly; a conveyor carried by the vehicle; an inner end on the conveyor extending rearwardly of the vehicle; an outer end on the conveyor extending forwardly of the vehicle, said conveyor being arranged to receive material moved sidewardly by the sweeper members; a container on the vehicle communicating with the conveyor arranged to receive material deposited on the conveyor by said sweeper members; means pivotally mounting the outer end of the conveyor with reference to the inner end thereof; and means for suspending said outer end to the frame whereby the outer end of the conveyor may be raised with the frame.

10. In a device of the class described, a vehicle, a frame extending forwardly of the vehicle; sweeper members extending transversely of the frame, said sweeper members being movable transversely of the frame and having flexible members thereon movable along the surface which the vehicle traverses to move material sidewardly; a conveyor carried by the vehicle extending rearwardly thereof, said conveyor being arranged to receive material moved sidewardly by the sweeper members; and a container on the vehicle communicating with the conveyor arranged to receive material deposited on the conveyor by said sweeper members; and blower means adjacent the container communicating with the conveyor arranged to blow material deposited therefrom into the container.

11. The combination called for in claim 10 with the addition of common drive means for the conveyor and fan.

12. In a device of the class described, a vehicle, a frame extending forwardly of the vehicle; sweeper memmers extending transversely of the frame, said sweeper members being movable transversely of the frame and having flexible members thereon movable along the surface which the vehicle traverses to move material sidewardly; a conveyor carried by the vehicle and extending rearwardly thereof, said conveyor being arranged to receive material moved sidewardly by the sweeper members; a container on the vehicle communicating with the conveyor arranged to receive material deposited on the conveyor by said sweeper members; means to tilt the container to deposit material therefrom; a cover for the container; means hingedly mounting the cover on the container; and co-acting means between the container and the cover operative by tilting the container to raise the cover when the container is tilted.

13. In a device of the class described, a vehicle, a frame extending forwardly of the vehicle; sweeper members extending transversely of the frame, said sweeper members being movable transversely of the frame and having flexible members thereon movable along the surface which the vehicle traverses to move material sidewardly; a conveyor carried by the vehicle and extending rearwardly thereof, said conveyor being arranged to receive material moved sidewardly by the sweeper members; a container on the vehicle communicating with the conveyor arranged to receive material deposited on the conveyor by said sweeper members; a flighted conveyor rotatably mounted on the frame in front of and parallel to, the sweeper members arranged to move material toward the conveyor.

14. In a device of the class described, a vehicle, a frame extending forwardly of the vehicle; sweeper members extending transversely of the frame, said sweeper members being movable transversely of the frame and having flexible members thereon movable along the surface which the vehicle traverses to move material sidewardly; a conveyor carried by the vehicle and extending rearwardly thereof, said conveyor being arranged to receive material moved sidewardly by the sweeper members; a container on the vehicle communicating with the conveyor arranged to receive material deposited on the conveyor by said sweeper members; an inclined ramp at the entry to the conveyor, said ramp being in position to allow the flexible members to move into engagement therewith to press the flexible members thereagainst and to move material therealong as the flexible members move upwardly.

15. In a device of the class described, a vehicle, a frame extending forwardly of the vehicle; sweeper members extending transversely of the frame, said sweeper members being movable transversely of the frame and having flexible members thereon movable along the surface which the vehicle traverses to move material sidewardly; a conveyor carried by the vehicle and extending rearwardly thereof, said conveyor being arranged to receive material moved sidewardly by the sweeper members; a container on the vehicle communicating with the conveyor arranged to receive material deposited on the conveyor by said sweeper members; means to tilt the container to deposit material therefrom; and a separable connection between the conveyor and the container to permit the container to be tilted with reference to the conveyor.

16. In a device of the class described, a vehicle, a frame extending forwardly of the vehicle; sweeper members extending transversely of the frame, said sweeper members being movable transversely of the frame and having flexible members thereon movable along the surface which the vehicle traverses to move material sidewardly; a conveyor carried by the vehicle and extending rearwardly thereof, said conveyor being arranged to receive material moved sidewardly by the sweeper members; a container on the vehicle communicating with the conveyor arranged to receive material deposited on the conveyor by said sweeper members; and a diagonally disposed deflector plate carried by the frame forwardly of the sweeper members arranged to deflect material toward the sweeper members.

References Cited

UNITED STATES PATENTS

| | | | |
|---|---|---|---|
| 581,735 | 5/1897 | Keller | 56—376 |
| 1,877,770 | 9/1932 | Larson | 56—376 |
| 3,293,679 | 12/1966 | Murphy | 15—84 |

FOREIGN PATENTS

| | | |
|---|---|---|
| 345,919 | 4/1931 | Great Britain. |
| 685,527 | 1/1953 | Great Britain. |
| 830,430 | 3/1960 | Great Britain. |
| 875,144 | 8/1961 | Great Britain. |

EDWARD L. ROBERTS, *Primary Examiner.*

U.S. Cl. X.R.

15—84; 56—376